United States Patent
Chen et al.

(10) Patent No.: US 10,429,660 B2
(45) Date of Patent: Oct. 1, 2019

(54) DIRECTIVE COLOUR FILTER AND NAKED-EYE 3D DISPLAY APPARATUS

(71) Applicants: SVG OPTRONICS CO., LTD., Jiangsu (CN); SOOCHOW UNIVERSITY, Jiangsu (CN)

(72) Inventors: Linsen Chen, Jiangsu (CN); Wen Qiao, Jiangsu (CN); Ming Zhu, Jiangsu (CN); Wenqiang Wan, Jiangsu (CN); Wenbin Huang, Jiangsu (CN); Donglin Pu, Jiangsu (CN); Pengfei Zhu, Jiangsu (CN)

(73) Assignees: SVG OPTRONICS CO., LTD., Jiangsu (CN); SOOCHOW UNIVERSITY, Jiangsu (CN)

( * ) Notice: Subject to any disclaimer, the term of this patent is extended or adjusted under 35 U.S.C. 154(b) by 0 days.

(21) Appl. No.: 15/774,794

(22) PCT Filed: Dec. 31, 2015

(86) PCT No.: PCT/CN2015/100166
§ 371 (c)(1),
(2) Date: May 9, 2018

(87) PCT Pub. No.: WO2017/080089
PCT Pub. Date: May 18, 2017

(65) Prior Publication Data
US 2018/0321500 A1 Nov. 8, 2018

(30) Foreign Application Priority Data
Nov. 13, 2015 (CN) .......................... 2015 1 0778086

(51) Int. Cl.
*G02F 1/1335* (2006.01)
*G02B 27/22* (2018.01)
(Continued)

(52) U.S. Cl.
CPC ......... *G02B 27/225* (2013.01); *G02B 5/1809* (2013.01); *G02B 5/1819* (2013.01);
(Continued)

(58) Field of Classification Search
CPC ......... G02F 1/133504; G02F 1/133514; G02B 2827/225; G02B 2015/1809; G02B 2015/1819
See application file for complete search history.

(56) References Cited

U.S. PATENT DOCUMENTS

| 5,497,189 A | 3/1996 | Aritake et al. |
| 9,389,429 B2 | 7/2016 | Gao et al. |

(Continued)

FOREIGN PATENT DOCUMENTS

| CN | 101951528 A | 1/2011 |
| CN | 102568031 A | 7/2012 |

(Continued)

OTHER PUBLICATIONS

Notice of Reasons for Refusal for Japanese Application No. 2018-524315, dated May 7, 2019, with translation, 6 pages.
(Continued)

*Primary Examiner* — James A Dudek
(74) *Attorney, Agent, or Firm* — RatnerPrestia (57) ABSTRACT

A directive color filter and a naked-eye 3D display apparatus are provided. The directive color filter includes a color filter and a directive functional structure layer. The color filter includes multiple light filtering units, and each light filtering unit includes at least three light filtering sub-units with different colors. The directive functional structure layer includes multiple structure units, and each structure unit and one light filtering unit are arranged correspondingly. Each structure unit includes at least three structure sub-units. Each structure sub-unit and one light filtering sub-unit are
(Continued)

arranged correspondingly. Each structure sub-unit includes multiple nano diffraction gratings.

15 Claims, 8 Drawing Sheets

(51) Int. Cl.
    *G02B 5/18* (2006.01)
    *G02B 5/20* (2006.01)
    *H04N 13/125* (2018.01)

(52) U.S. Cl.
    CPC ....... *G02B 5/201* (2013.01); *G02F 1/133504* (2013.01); *G02F 1/133514* (2013.01); *G02F 1/133516* (2013.01); *G02F 2001/133521* (2013.01); *G02F 2203/055* (2013.01); *G02F 2203/22* (2013.01); *H04N 13/125* (2018.05)

(56) References Cited

U.S. PATENT DOCUMENTS

| | | | |
|---|---|---|---|
| 2003/0067460 A1 | 4/2003 | Tomono | |
| 2010/0091225 A1 | 4/2010 | Cho et al. | |
| 2013/0169518 A1 | 7/2013 | Wu et al. | |
| 2014/0293759 A1* | 10/2014 | Taff | G02B 27/2292 368/239 |
| 2014/0300840 A1* | 10/2014 | Fattal | G02F 1/133615 349/15 |
| 2017/0176669 A1* | 6/2017 | Chung | G02B 5/1819 |
| 2017/0299799 A1* | 10/2017 | Fattal | G02B 6/005 |
| 2017/0363794 A1* | 12/2017 | Wan | G02B 27/22 |
| 2017/0363877 A1* | 12/2017 | Zhu | G02B 6/0035 |
| 2019/0191144 A1* | 6/2019 | Arbabi | H04N 13/229 |

FOREIGN PATENT DOCUMENTS

| | | |
|---|---|---|
| CN | 202870437 U | 4/2013 |
| CN | 103185968 A | 7/2013 |
| CN | 103246195 A | 8/2013 |
| CN | 103982818 A | 8/2014 |
| CN | 104460115 A | 3/2015 |
| EP | 0678761 A2 | 10/1995 |
| JP | H06110374 A | 4/1994 |
| JP | H06281804 A | 10/1994 |
| JP | H08327947 A | 12/1996 |
| JP | 200142258 A | 2/2001 |
| JP | 2015125407 A | 7/2015 |

OTHER PUBLICATIONS

International Search Report issued in PCT/CN2015/100166 dated Aug. 22, 2016, 6 pages.

* cited by examiner

DIRECTIVE COLOUR FILTER AND NAKED-EYE 3D DISPLAY APPARATUS

This application is the National Phase Application of PCT/CN2015/100166, filed on Dec. 31, 2015 which claims the priority to Chinese Patent Application No. 201510778086.5, titled "DIRECTIVE COLOUR FILTER AND NAKED-EYE 3D DISPLAY APPARATUS", filed on Nov. 13, 2015 with the Chinese State Intellectual Property Office, both of which are incorporated herein by reference in their entireties.

FIELD

The present disclosure relates to the technical field of stereo display, and in particular to a directional color filter and a naked-eye 3D display device.

BACKGROUND

With the 3D display technology, the picture becomes stereo and realistic, so that the audience has an immersive feeling. Therefore, the 3D display technology is more and more popular.

The principle of the 3D display technology is described as follows. Different parallax images are respectively received by left and right eyes of a person, and the parallax images are superposed by the brain to form an image with three-dimensional directions such as forward/backward, leftward/rightward, upward/downward, and proximal/distal directions. Various types of naked-eye 3D display devices are generated based on the parallax principle in the conventional technology. However, the existing naked-eye 3D display devices suffer from problems of causing visual fatigue due to the image crosstalk and having small viewing angles. Therefore, the existing naked-eye 3D display devices have not really entered the field of consumer electronics.

In the conventional technology, a new 3D display technology, i.e., a directional backlight technology, is developed. According to the directional backlight technology, a specially-designed structure is added to a light guide plate to transmit light in different directions so as to form parallax illumination with a large viewing angle. For example, a naked-eye 3D backlight module is proposed in CN201410187534.X, in which one or more sets of LED timing light sources are used in combination with a convex lens, a polygonal prism and a parallax barrier to achieve the multi-view 3D display. However, the design and the precision machining precision of the lens, the prism and other structures in the backlight module are difficult to be technically achieved. In addition, in a case that light emitted by two light sources is incident on the same region of the parallax barrier, light of two colors is simultaneously emitted from the region, resulting in crosstalk between the light of two colors emitted from the region. Therefore, the naked-eye 3D display devices based on the directional backlight technology have not been practically used.

SUMMARY

In view of this, a directional color filter and a naked-eye 3D display device are provided according to the present disclosure, to solve the problems in the conventional technology that the design and the precision machining precision of the lens, the prism and other structures in the backlight module are difficult to be technically achieved and light crosstalk easily occurs.

In order to achieve the above objects, the following technical solutions are provided according to the present disclosure.

A directional color filter is provided, which includes: a color filter and a directional function structure layer;

the color filter includes multiple filtering units, where each of the filtering units includes at least three filtering subunits for different colors, colors of light transmitted through the filtering subunits for the same color are the same;

the directional function structure layer is arranged on a light emitting surface of the color filter and includes multiple structure units, where each of the structure units is arranged corresponding to one of the filtering units, each of the structure units includes at least three structure subunits, each of the structure subunits is arranged corresponding to one of the filtering subunits so that light transmitted through each of the filtering subunits is incident to a corresponding one of the structure subunits, where each of the structure subunits includes multiple nanometer diffraction gratings; nanometer diffraction gratings in the same structure subunit have different periods and different orientation angles so that light with the same color transmitted through the same structure subunit has different viewing angles; nanometer diffraction gratings at a same position in structure subunits in the same filtering unit corresponding to filtering subunits for different colors have different periods and different orientation angles, so that light with different colors for compositing an image with a same viewing angle has the same viewing angle.

Preferably, the filtering unit may include a red filtering subunit, a green filtering subunit and a blue filtering subunit, the red filtering subunit transmits only red light, the green filtering subunit transmits only green light, and the blue filtering subunit transmits only blue light; and the structure unit may include a first structure subunit, a second structure subunit and a third structure subunit, the first structure subunit is arranged corresponding to the red filtering subunit, the second structure subunit is arranged corresponding to the green filtering subunit, and the third structure subunit is arranged corresponding to the blue filtering subunit.

Preferably, the period and the orientation angle of the nanometer diffraction grating may be determined based on a wavelength and an incident angle of incident light, as well as a diffraction angle and a diffraction azimuth angle of diffracted light.

Preferably, the directional color filter may be fabricated by a photolithography technology, an ultraviolet continuous variable space-frequency photolithography technology, or a nanoimprint technology.

Preferably, a viewpoint of the directional color filter may have a field angle equal to or greater than 150 degrees.

The period of the nanometer diffraction grating in the directional color filter may range from 300 nanometers to 3 micrometers.

A naked-eye 3D display device is provided, which includes: the directional color filter, a light source array and a liquid crystal display panel;

the directional color filter adjusts phases of laser light transmitted through the filtering subunits and the corresponding structure subunits, so that light with the same color transmitted through the same filtering subunit has different viewing angles and light with different colors for compositing an image with a same viewing angle has the same viewing angle;

the light source array is arranged on a light incident side of the directional color filter and includes at least three types of laser point light sources, where different types of laser point light sources emit laser light with different colors, the laser point light source is configured to emit, at a preset position, laser light to be incident to the directional color filter at a preset angle; and the liquid crystal display panel is arranged on a light emitting side of the directional color filter and includes multiple pixel units, where each of the pixel units includes at least three subpixels, each of the pixel units is arranged corresponding to one of the filtering units, subpixels in the same pixel unit are arranged corresponding to filtering subunits in the filtering unit corresponding to the pixel unit in a one-to-one correspondence, and where the liquid crystal display panel adjusts amplitudes of laser light transmitted through the subpixels, so that light with different colors and having a same viewing angle composites an image with the same viewing angle and images with different viewing angles composite a 3D display image.

Preferably, the laser point light source may include: a laser device and a laser beam expander;

the laser device is configured to emit laser light; and the laser beam expander is arranged on a light emitting path of the laser device, and the laser beam expander is configured to expand a diameter of the laser light so that the laser light is irradiated onto an entire panel of the directional color filter.

Preferably, the light source array may include a red laser point light source emitting red light, a green laser point light source emitting green light, and a blue laser point light source emitting blue light.

Preferably, the at least three filtering subunits for different colors may include a red filtering subunit, a green filtering subunit and a blue filtering subunit, the red filtering subunit transmits only red laser light, the green filtering subunit transmits only green laser light, and the blue filtering subunit transmits only blue laser light;

the at least three structure subunits may include a first structure subunit, a second structure subunit and a third structure subunit;

the at least three subpixels may include a red subpixel, a green subpixel and a blue subpixel; and the red subpixel is arranged corresponding to the first structure subunit and the red filtering subunit, the green subpixel is arranged corresponding to the second structure subunit and the green filtering subunit, and the blue subpixel is arranged corresponding to the third structure subunit and the blue filtering subunit.

Compared with the conventional technology, the technical solutions provided in the present disclosure have the following advantages.

With the directional color filter and the naked-eye 3D display device according to the present disclosure, dichroic filtering is performed on light by the corresponding filtering subunit before the light is incident to the nanometer diffraction grating in the directional function structure layer, so that the case of light of two colors being emitted from the same nanometer diffraction grating does not occur, thereby avoiding crosstalk of the emitted light.

In addition, it is not required to use high-precision structures such as a lens or a prism in the present disclosure, so that the directional color filter can be easily implemented. Therefore, the multi-view naked-eye 3D display device without generating fatigue based on the directional backlight technology can be practically used.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described. It is apparent that, the drawings in the following description show only some embodiments of the present disclosure, and other drawings may be obtained by those skilled in the art from the drawings without creative efforts.

DETAILED DESCRIPTION OF EMBODIMENTS

Technical solutions in embodiments of the present disclosure are clearly and completely described below in conjunction with the drawings in the embodiments of the present disclosure. It is apparent that embodiments described below are only some embodiments of the present disclosure, rather than all of the embodiments. All other embodiments obtained by those skilled in the art based on the embodiments of the present disclosure without creative efforts fall within the protection scope of the present disclosure.

Figure 1:
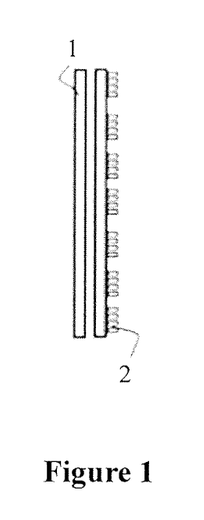
FIG. 1 is a schematic cross-sectional structural view of a directional color filter according to an embodiment of the present disclosure.
Figure 2:
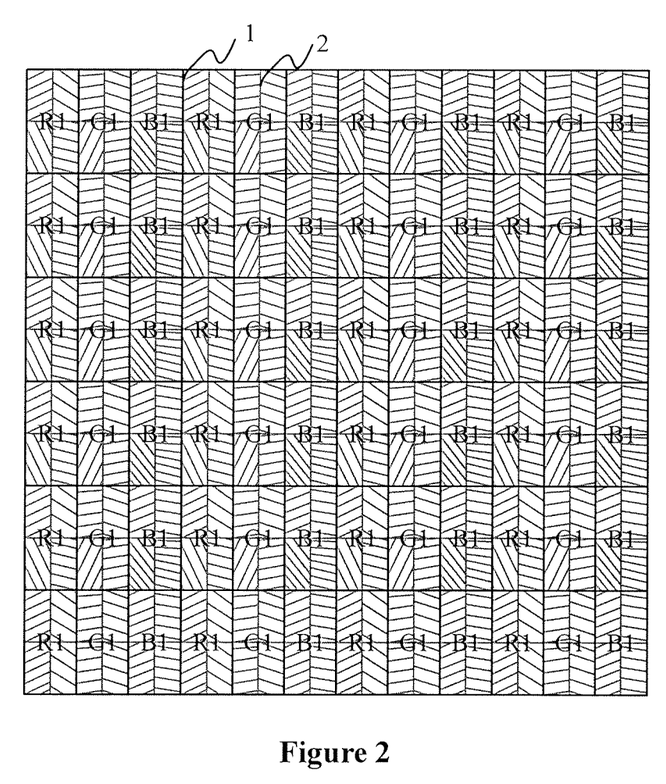
FIG. 2 is a schematic plan structural view of a directional color filter according to an embodiment of the present disclosure.

A directional color filter is provided according to an embodiment of the present disclosure. Reference is made to FIG. 1 and FIG. 2. FIG. 1 is a schematic cross-sectional structural view of the directional color filter, and FIG. 2 is a schematic plan structural view of the directional color filter. The directional color filter includes a color filter 1 and a directional function structure layer 2 arranged on a light emitting surface of the color filter 1.

Figure 3:
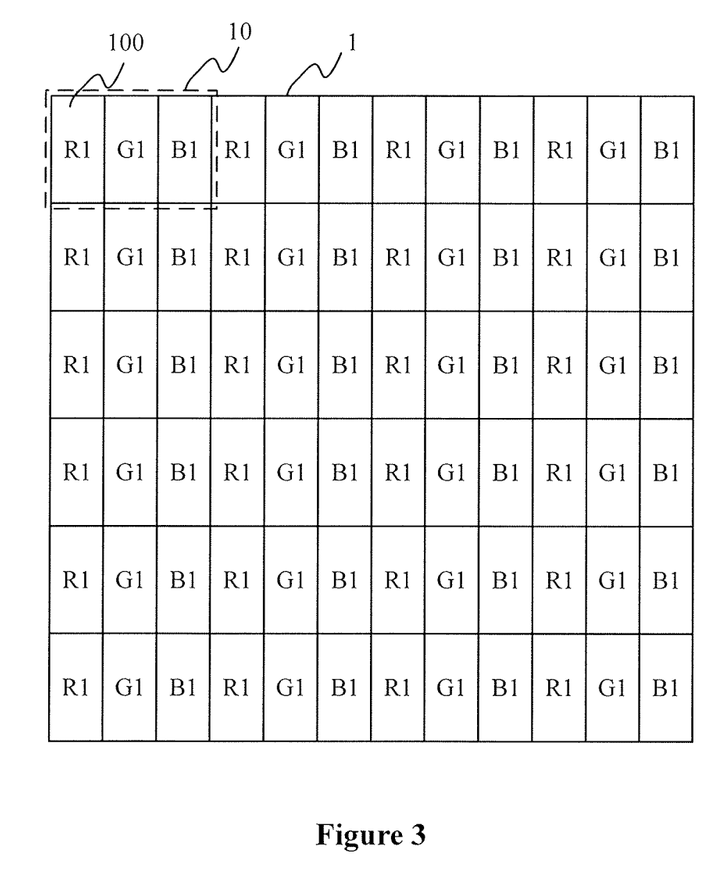
FIG. 3 is a schematic plan structural view of a color filter in the directional color filter shown in FIG. 1.

Referring to FIG. 3, the color filter 1 includes multiple filtering units 10 arranged in an array. Each filtering unit 10 includes at least three filtering subunits 100 for different colors. Colors of light transmitted through the filtering subunits 100 for the same color are the same.

Specifically, the filtering unit 10 may include three filtering subunits 100 for different colors. The three filtering subunits may include a red filtering subunit R1, a green filtering subunit G1 and a blue filtering subunit B1. The red filtering subunit R1 transmits only red light, the green filtering subunit G1 transmits only green light, and the blue filtering subunit B1 transmits only blue light. That is, a film arranged in regions of the red filtering subunit R1 transmits only red light, and cannot transmit light with other colors; a film arranged in regions of the green filtering subunit G1 transmits only green light, and cannot transmit light with other colors; a film arranged in regions of the blue filtering subunit B1 transmits only blue light, and cannot transmit light with other colors. Practically, the present disclosure is not limited thereto. For example, in other embodiments, the filtering unit may include four filtering subunits including a red filtering subunit, a green filtering subunit, a blue filtering subunit and a white filtering subunit.

Figure 4:
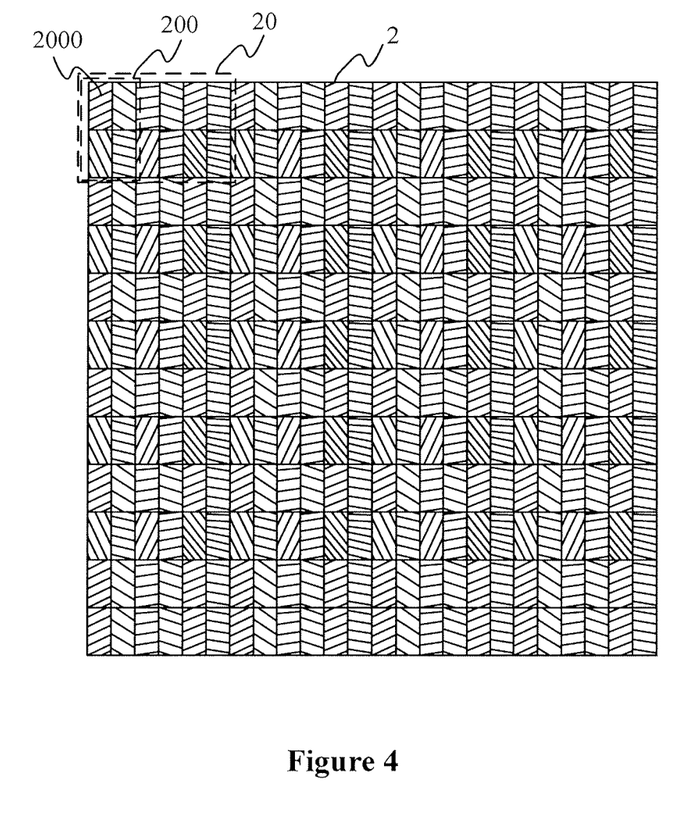
FIG. 4 is a schematic plan structural view of a directional function structure layer in the directional color filter shown in FIG. 1.

Referring to FIG. 4, the directional function structure layer 2 includes multiple structure units 20 arranged in an array. Each structure unit 20 is arranged corresponding to one filtering unit 10, and each structure unit 20 includes at least three structure subunits 200. Each structure subunit 200 is arranged corresponding to one filtering subunit 100, so that light with the same color transmitted through each filtering subunit 100 is incident to a corresponding structure subunit 200. In this embodiment, the corresponding arrangement may be understood that, in a direction perpendicular to a panel of the directional color filter, a projection of the filtering subunit 100 completely covers a projection of the structure subunit 200, or a projection of the filtering unit 10 completely covers a projection of the structure unit 20.

In this embodiment, each structure subunit 200 includes multiple diffraction gratings arranged in an array at the nanometer scale, i.e., nanometer diffraction gratings 2000. Nanometer diffraction gratings 2000 in the same structure subunit 200 have different periods and different orientation angles, so that light with the same color transmitted through the same structure subunit 200 has different viewing angles, i.e., so that the transmitted light propagates in different directions. Nanometer diffraction gratings 2000 at the same position in structure subunits 200 in the same structure unit 20 corresponding to filtering subunits 100 for different colors have different periods and different orientation angles, so that light with different colors for compositing an image with the same viewing angle has the same viewing angle.

Figure 5:
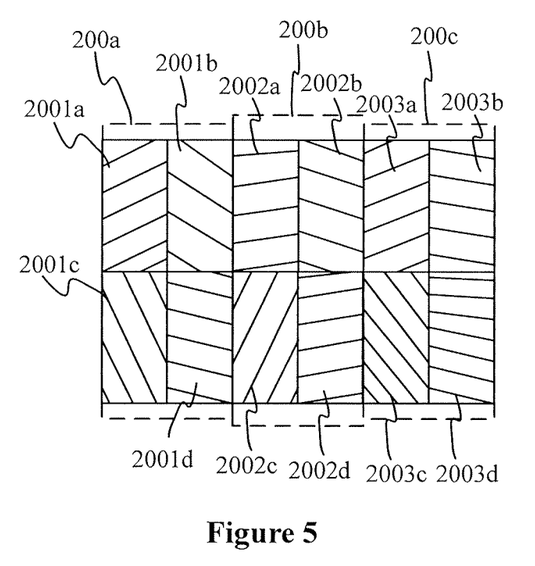
FIG. 5 is a partly enlarged view of the directional function structure layer shown in FIG. 4.

Referring to FIG. 5, it is assumed that, each structure unit 20 includes three structure subunits 200 including a first structure subunit 200a, a second structure subunit 200b and a third structure subunit 200c, the first structure subunit 200a is arranged corresponding to the red filtering subunit R1, the second structure subunit 200b is arranged corresponding to the green filtering subunit G1, and the third structure subunit 200c is arranged corresponding to the blue filtering subunit B1.

Further, each of the three structure subunits includes 2×2 nanometer diffraction gratings. That is, the first structure subunit 200a includes four nanometer diffraction gratings 2001a, 2001b, 2001c and 2001d. The second structure subunit 200b includes four nanometer diffraction gratings 2002a, 2002b, 2002c and 2002d. The third structure subunit 200c includes four nanometer diffraction gratings 2003a, 2003b, 2003c and 2003d.

The four nanometer diffraction gratings 2001a, 2001b, 2001c and 2001d have different periods and different orientation angles, so that the red light transmitted through the four nanometer diffraction gratings has four different viewing angles. The four nanometer diffraction gratings 2002a, 2002b, 2002c and 2002d have different periods and different orientation angles, so that the green light transmitted through the four nanometer diffraction gratings has four different viewing angles. The four nanometer diffraction gratings 2003a, 2003b, 2003c and 2003d have different periods and different orientation angles, so that the blue light transmitted through the four nanometer diffraction gratings has four different viewing angles.

Moreover, the three nanometer diffraction gratings 2001a, 2002a and 2003a have different periods and different orientation angles, the three nanometer diffraction gratings 2001b, 2002b and 2003b have different periods and different orientation angles, the three nanometer diffraction gratings 2001c, 2002c and 2003c have different periods and different orientation angles, and the three nanometer diffraction gratings 2001d, 2002d and 2003d have different periods and different orientation angles, so that light with different colors for compositing an image with the same viewing angle has the same viewing angle.

Light emitted by nanometer diffraction gratings at the same position in different structure subunits 200 is converged at a viewpoint to provide a light source for an image with the same viewing angle. Referring to FIG. 5, light emitted by the three nanometer diffraction gratings 2001a, 2002a and 2003a has the same viewing angle and can be converged at a viewpoint 1; light emitted by the three nanometer diffraction gratings 2001b, 2002b and 2003b can be converged at a viewpoint 2; light emitted by the three nanometer diffraction gratings 2001c, 2002c and 2003c can be converged at a viewpoint 3; and light emitted by the three nanometer diffraction gratings 2001d, 2002d and 2003d can be converged at a viewpoint 4. That is, the directional color filter shown in FIG. 5 can provide a light source for images with four different viewing angles.

In this embodiment, the number of viewpoints of the directional color filter corresponds to the number of nanometer diffraction gratings in each structure subunit. In a case that there are two viewpoints, each structure subunit includes two nanometer diffraction gratings. In a case that there are four viewpoints, each structure subunit includes 2×2 (i.e., 4) nanometer diffraction gratings. In a case that there are nine viewpoints, each structure subunit includes 3×3 (i.e., 9) nanometer diffraction gratings. It can be seen that a display resolution of a 3D image formed by the directional color filter in this embodiment is at least three times of a display resolution of a normal 2D image.

The red light transmitted through the first structure subunit 200a, the green light transmitted through the second structure subunit 200b, and the blue light transmitted through the third structure subunit 200c have different wavelengths. Therefore, in a case that nanometer diffraction gratings at the same position in the three structure subunits have the same period and the same orientation angle, for example, in a case that the nanowire diffraction gratings 2001a, 2002a and 2003a have the same period and the same orientation angle, the red light transmitted through the nanometer diffraction grating 2001a, the green light transmitted through the nanometer diffraction grating 2002a, and the blue light transmitted through the nanometer diffraction grating 2003a have different diffraction angles, which results in that the red light emitted by the nanometer diffraction grating 2001a, the green light emitted by the nanometer diffraction grating 2002a, and the blue light emitted by the nanometer diffraction grating 2003a are not converged at the same focal point. That is, light of the three colors has different viewing angles, therefore the light of the three colors cannot composite a color image with the same viewing angle according to the three primary color theory.

That is, in this embodiment, the period and the orientation angle of the nanometer diffraction grating in the first structure subunit 200*a* are correspondingly set based on a wavelength and an incident angle of the red light transmitted through the red filtering subunit R1. The period and the orientation angle of the nanometer diffraction grating in the second structure subunit 200*b* are correspondingly set based on a wavelength and an incidence angle of the green light transmitted through the green filtering subunit G1. The period and the orientation angle of the nanometer diffraction grating in the third structure subunit 200*c* are correspondingly set based on a wavelength and an incident angle of the blue light transmitted through the blue filtering subunit B1.

Figure 6:
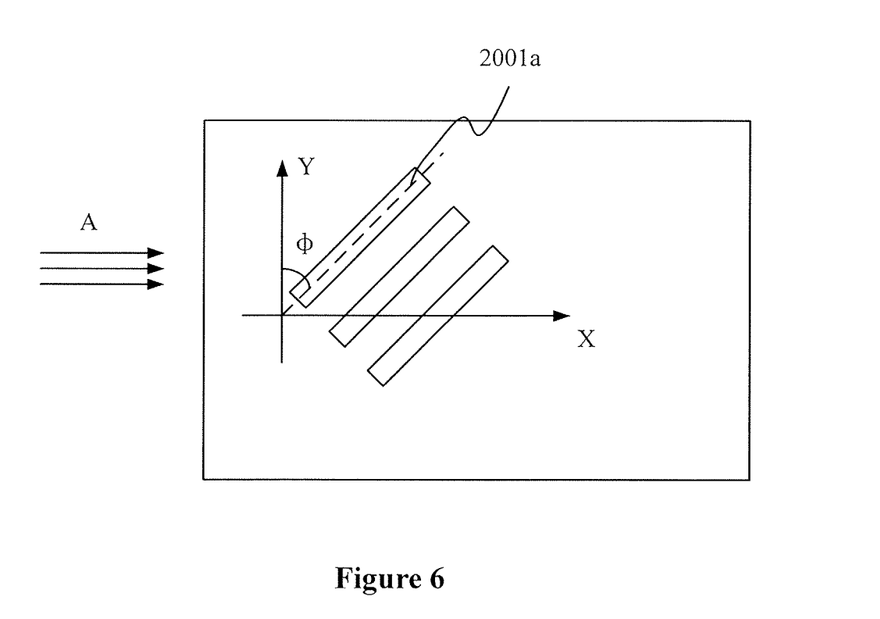
FIG. 6 is a structural diagram of a nanometer diffraction grating shown in FIG. 4 under an XY plane.
Figure 7:
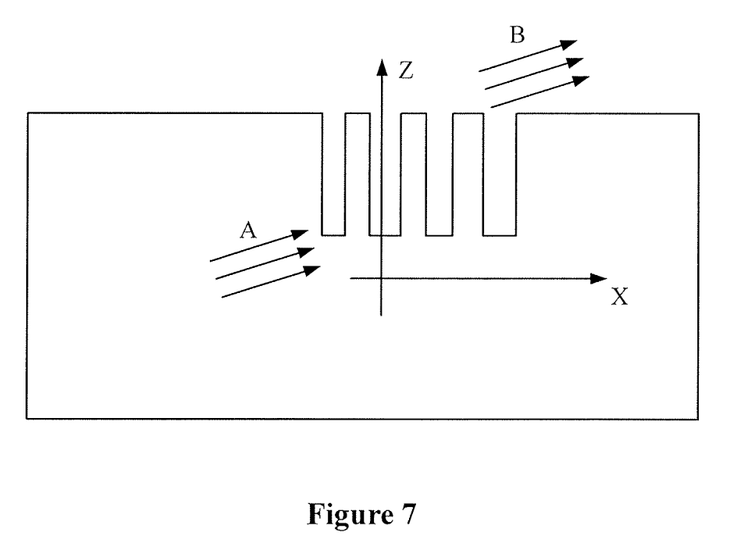
FIG. 7 is a structural diagram of the nanometer diffraction grating shown in FIG. 4 under an XZ plane.

Specifically, the period and the orientation angle of the nanometer diffraction grating are determined based on a wavelength and an incident angle of incident light, as well as a diffraction angle and a diffraction azimuth angle of diffracted light. Taking the nanometer diffraction grating 2001*a* as an example, reference is made to FIG. 6 and FIG. 7. FIG. 6 is a structural diagram of the nanometer diffraction grating 2001*a* under an XY plane, and FIG. 7 is a structural diagram of the nanometer diffraction grating 2001*a* under an XZ plane. According to the grating equation, a period and an orientation angle of a nanometer diffraction grating meet the following relationships.

$$\tan \varphi_1 = \sin \varphi / (\cos \varphi - n \sin \theta(\Lambda/\lambda)) \quad (1)$$

$$\sin^2(\theta_1) = (\lambda/\Lambda)^2 + (n \sin \theta)^2 - 2n \sin \theta \cos \varphi(\lambda/\Lambda) \quad (2)$$

In which, incident light A is incident to the nanometer diffraction grating at a certain incident angle; $\theta_1$ represents a diffraction angle of diffracted light B emitted by the nanometer diffraction grating, i.e., an angle between the diffracted light and the z-axis positive direction; $\Phi_1$ represents an azimuth angle of the diffracted light B, i.e., an angle between the diffracted light and the x-axis positive direction; $\theta$ represents an incident angle of the incident light A, i.e., an angle between the incident light and the z-axis positive direction; $\lambda$ represents a wavelength of the incident light A; $\Lambda$ represents a period of the nanometer diffraction grating; $\Phi$ represents an orientation angle of the nanometer diffraction grating, i.e., an angle between a direction along a groove of the nanometer diffraction grating and the y-axis positive direction; and n represents a refractive index of the incident light A in a medium.

That is, after the wavelength and the incident angle of the incident light, as well as the diffraction angle and the diffraction azimuth angle of the diffracted light are determined, the period and the orientation angle of the nanometer diffraction grating can be calculated from the above two formulas. For example, it is assumed that the red light with a wavelength of 650 nanometers is incident at an angle of 60°, the diffraction angle of the diffracted light is set as 10°, and the diffraction azimuth angle of the diffracted light is set as 45°. The calculated period of the nanometer diffraction grating is 550 nanometers, and the calculated orientation angle is −5.96°.

The periods and orientation angles of the nanometer diffraction gratings in each structure unit are set according to the above principle. Since a nanometer diffraction grating is equivalent to a single off-axis Fresnel structure, light emitted by the nanometer diffraction gratings at the same position in the structure subunits can be converged at a viewpoint to composite an image with the same viewing angle. In a case that each structure subunit includes n×m nanometer diffraction gratings, the n×m nanometer diffraction gratings form n×m off-axis Fresnel structures with different focal points, thereby obtaining n×m different viewpoints. In addition, color and grayscale may be controlled by a liquid crystal display panel. Based on the above, a multi-view naked-eye 3D holographic image can be displayed. In which, n is a natural number greater than or equal to one, and m is a natural number greater than or equal to two.

The holographic image is an image in which amplitude information and phase information are included. The entire image at different viewing angles can be observed from different spatial observation points. In addition, the images do not interfere with each other. In this case, three-dimensional information can be truly reproduced without generating visual fatigue, and the stereo display effect is independent from an observation distance of an observer. Therefore, the directional color filter in this embodiment may be used in combination with a laser light source and a liquid crystal display panel, to achieve the multi-view naked-eye 3D display effect without generating visual fatigue.

In this embodiment, the directional function structure layer 2 may be directly fabricated on the color filter 1, or the directional function structure layer 2 may be bonded to the color filter 1. In a process of viewing a 3D image formed by means of the directional color filter including the color filter 1, even if the viewing position changes upward and downward, no color hopping occurs in the viewed 3D image. In a case that the color filter 1 is directly inlaid in the directional function structure layer 2 without dichroic filtering, the red light, the green light and the blue light can also be imaged at the same spatial position. However, due to the dispersion effect of the nanometer diffraction grating, light crosstalk easily occurs when the viewing position changes upward and downward, thereby resulting in the color hopping of the 3D image.

In this embodiment, the directional color filter may be fabricated by a photolithography technology, an ultraviolet continuous variable space-frequency photolithography technology, or a nanoimprint technology. The ultraviolet continuous variable space-frequency photolithography technology may be understood with reference to a photolithography apparatus and a photolithography method recited in CN201310166341.1. It should be noted that, in this embodiment, nanometer diffraction gratings with different orientations may be fabricated by the photolithography technology, and a template for imprinting may be fabricated. Then a structure unit array formed by the nanometer diffraction gratings is imprinted in batches by the nanoimprint technology.

In this embodiment, the directional color filter is configured to cause light for compositing images with different viewing angles to be converged in the vicinity of an observation position and cause the generated viewpoints in space to be separated to form a horizontally-distributed observation light field (window). The structure unit in the directional color filter includes structure subunits corresponding to subpixels in an image with a viewing angle. The structure subunit includes an array of nanometer diffraction gratings designed according to the holographic principle. The array may be a diffraction array formed by a set of nanometer diffraction gratings or multiple sets of nanometer diffraction gratings. Wave-front conversion can be performed on the incident light by means of the diffraction array, and the diffracted light can be projected in front of a display screen to form a convergence viewpoint. In this way, no crosstalk spatially occurs between images with different viewing angles.

With the directional color filter in this embodiment, dichroic filtering is performed on light by the filtering subunit before the light is incident to the nanometer diffraction grating in the directional function structure layer, so that the case of light of two colors being emitted from the same nanometer diffraction grating does not occur, thereby avoiding crosstalk of the emitted light. In addition, the directional color filter in this embodiment is not required to be formed by high-precision structures such as a lens or a prism, so that the directional color filter can be easily implemented. Therefore, the multi-view naked-eye 3D display device without generating fatigue based on the directional backlight technology can be practically used.

Figure 8:
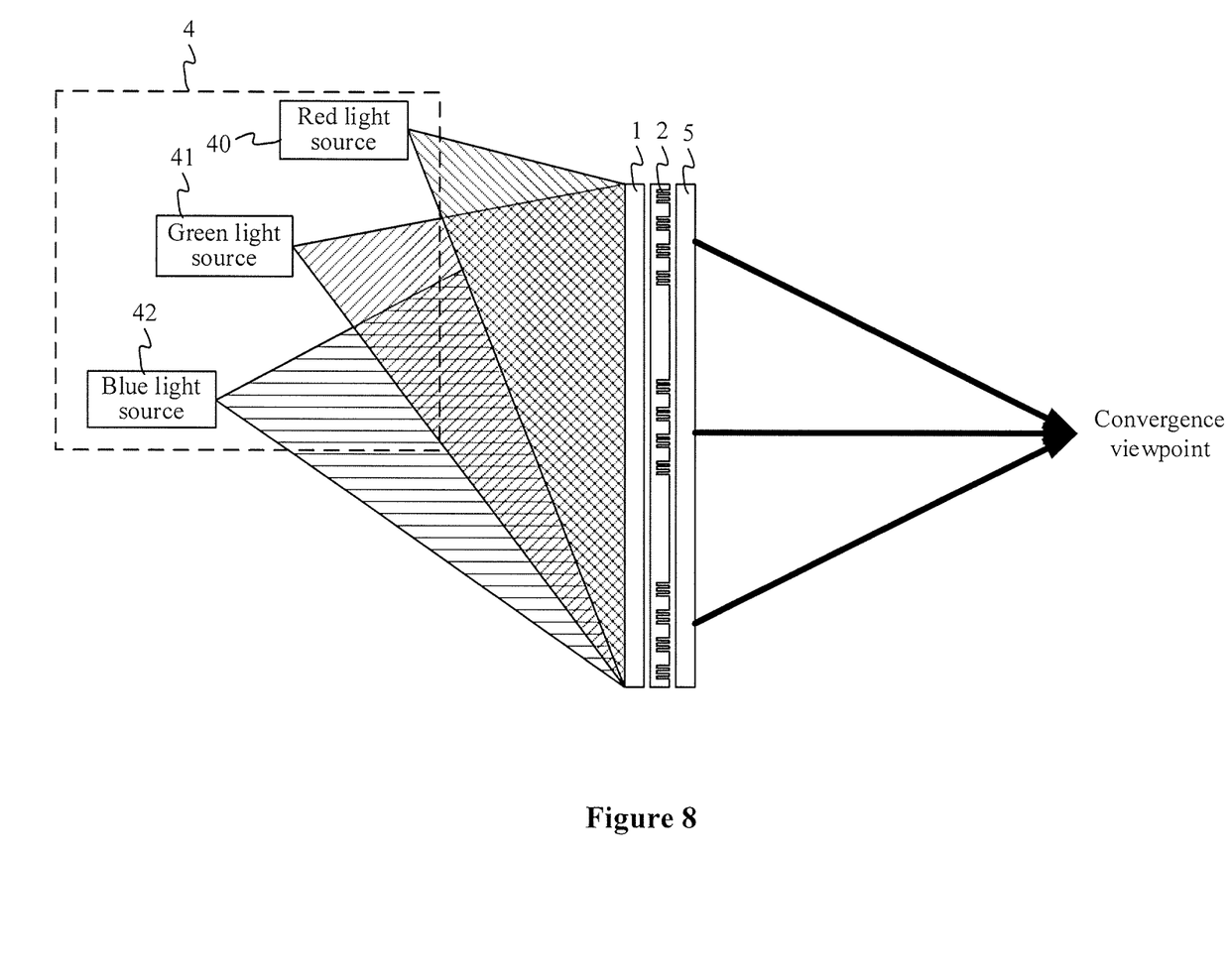
FIG. 8 is a schematic cross-sectional structural view of a naked-eye 3D display device according to an embodiment of the present disclosure.

According to another embodiment of the present disclosure, a naked-eye 3D display device is provided. As shown in FIG. 8, the naked-eye 3D display device includes a directional color filter 3, a light source array 4 arranged on a light incident side of the directional color filter 3, and a liquid crystal display panel 5 arranged on a light emitting side of the directional color filter 3.

The light source array 4 includes at least three types of laser point light sources. Different types of laser point light sources emit laser light with different colors. The laser point light source is configured to emit, at a preset position, laser light to be incident to the directional color filter 3 at a preset angle. The laser point light source in this embodiment includes a laser device emitting the laser light, and a laser beam expander arranged on a light emitting path of the laser device. The laser beam expander is configured to expand a diameter of the laser light, so that the laser light is irradiated onto an entire panel of the directional color filter 3.

Optionally, the light source array 4 in this embodiment may include a red laser point light source 40 that emits red light, a green laser point light source 41 that emits green light, and a blue laser point light source 42 that emits blue light. Optionally, a plane center of the directional color filter 3 may be set as an origin, and a direction which is perpendicular to the emitting plane of the directional color filter 3 and is directed to the observation direction, may be set as the Z-axis positive direction. In this case, the three laser point light sources are located at the origin in the X-axis direction, and the three laser point light sources are located at the same position in the Y-axis direction and at different positions in the Z-axis negative direction under the YZ plane. The period and the orientation angle of the nanometer diffraction grating in the directional color filter 3 are affected by a position of the laser point light source, a wavelength of the emitting light, and an angle of the emitting light, i.e., an angle at which light is incident to the directional color filter. Therefore, when the laser point light source emits, at the preset position, the laser light to be incident to the directional color filter 3 at the preset angle, the period and the orientation angle of the nanometer diffraction grating in the directional color filter 3 can be determined.

The structure and function of the directional color filter 3 in this embodiment are the same as those of the directional color filter in the above embodiment. Reference may be made to FIG. 1 to FIG. 4 and the related description, and details thereof are not repeated herein. The directional color filter 3 adjusts phases of light transmitted through the filtering subunits and the corresponding structure subunits, so that light with the same color transmitted through the same filtering subunit has different viewing angles, and light with different colors for compositing an image with the same viewing angle has the same viewing angle.

Figure 9:
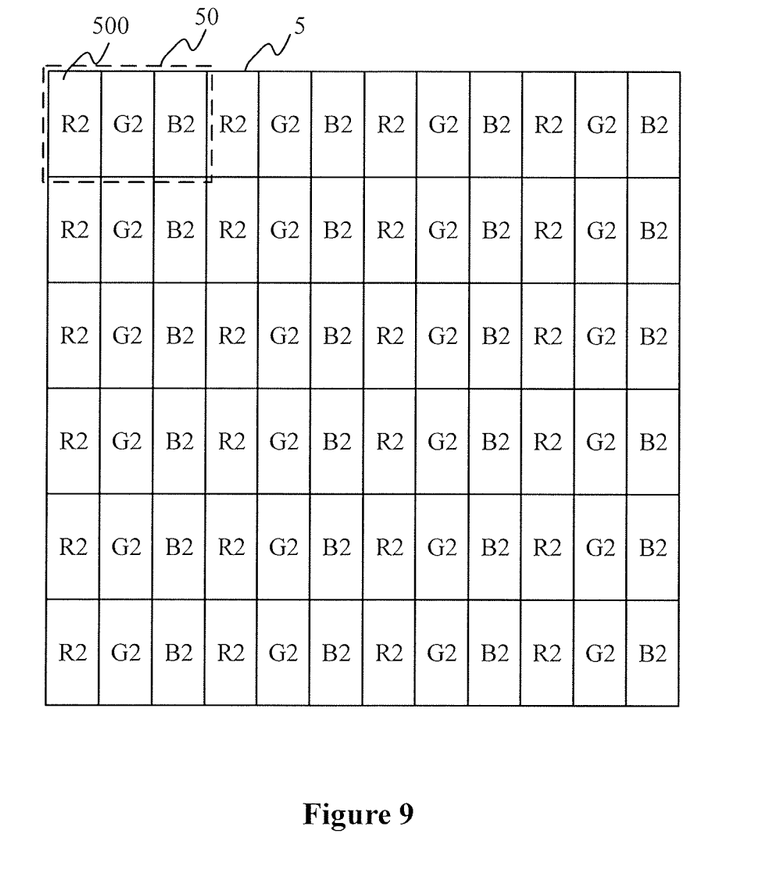
FIG. 9 is a schematic plan structural view of a liquid crystal display panel in the naked-eye 3D display device shown in FIG. 8.

Referring to FIG. 9 and FIG. 3, the liquid crystal display panel 5 in this embodiment includes multiple pixel units 50.

Each pixel unit 50 includes at least three subpixels 500. Each pixel unit 50 is arranged corresponding to one filtering unit 10. Subpixels 500 in the same pixel unit 50 are arranged corresponding to filtering subunits 100 in the corresponding filtering unit 10 in a one-to-one correspondence. The liquid crystal display panel adjusts amplitudes of light transmitted through the subpixels 500, so that light with different colors and having the same viewing angle composites an image with the same viewing angle, and images with different viewing angles composite a 3D display image.

Optionally, referring to FIG. 3, FIG. 5 and FIG. 9, the filtering unit 10 in the directional color filter 3 in this embodiment may include three filtering subunits 100 including a red filtering subunit R1, a green filtering subunit G1 and a blue filtering subunit B1. The red filtering subunit R1 transmits only red light, the green filtering subunit G1 transmits only green light, and the blue filtering subunit B1 transmits only blue light. The structure unit 20 in the directional color filter 3 includes three structure subunits 200 including a first structure subunit 200a, a second structure subunit 200b, and a third structure subunit 200c. The pixel unit 50 in the liquid crystal display panel 5 includes three subpixels 500 including a red subpixel R2, a green subpixel G2 and a blue subpixel B2. The red subpixel R2 is arranged corresponding to the first structure subunit 200a and the red filtering subunit R1. The green subpixel G2 is arranged corresponding to the second structure subunit 200b and the green filtering subunit G1. The blue subpixel B2 is arranged corresponding to the third structure subunit 200c and the blue filtering subunit B1.

Figure 10:
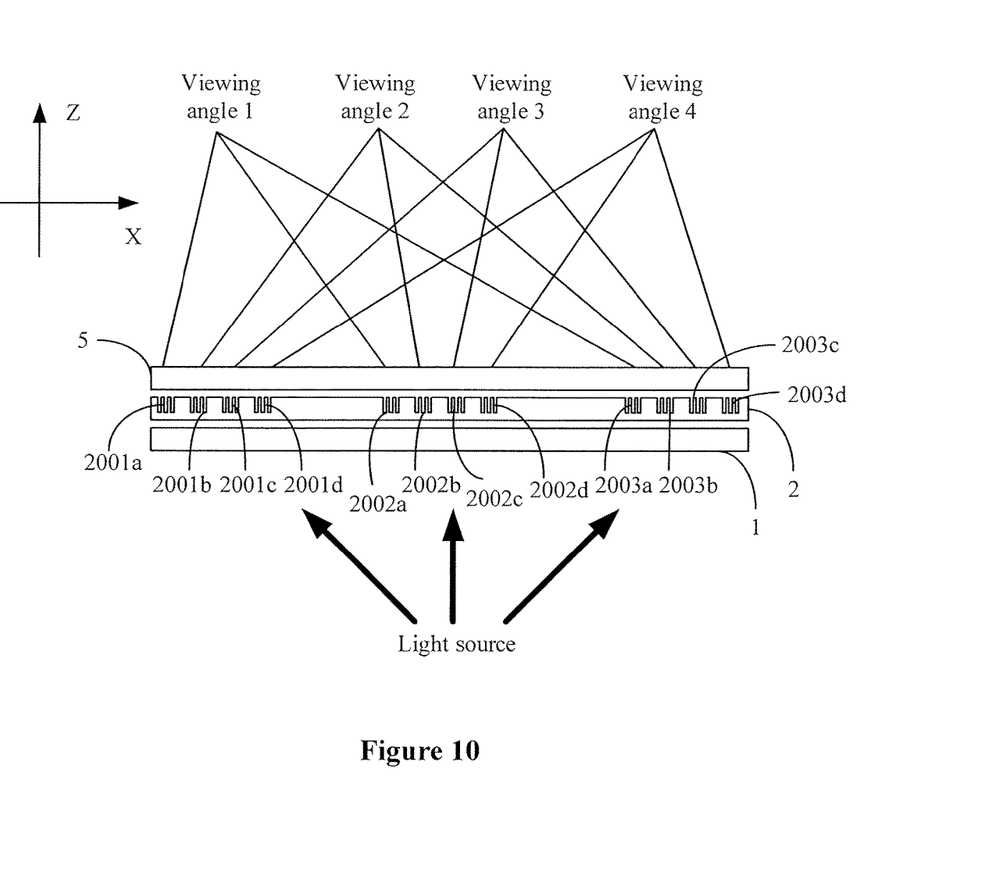
FIG. 10 is an optical path diagram of the naked-eye 3D display device shown in FIG. 8.

Taking FIG. 5 and FIG. 10 as examples, the first structure subunit 200a includes nanometer diffraction gratings 2001a to 2001d, the second structure subunit 200b includes nanometer diffraction gratings 2002a to 2002d, and the third structure subunit 200c includes nanometer diffraction gratings 2003a to 2003d. In addition, 2001a, 2002a and 2003a correspond to a viewpoint 1. 2001b, 2002b and 2003b correspond to a viewpoint 2. 2001c, 2002c and 2003c correspond to a viewpoint 3. 2001d, 2002d and 2003d correspond to a viewpoint 4. In this way, the viewpoints of images with four viewing angles are separated from each other, and each viewpoint corresponds to one image.

The image with each viewing angle is separated into three monochrome images according to three colors of red, green and blue. As shown in FIG. 10, the red laser point light source 40 emitting red light is diffused and then is projected onto the directional color filter 3. Only the red filtering subunit R1 on the directional color filter 3 can transmit the red light, and the red filtering subunit R1 transmits the red light to a structure subunit corresponding to the red filtering subunit R1 on the directional function structure layer. The structure subunit includes four nanometer diffraction gratings 2001a to 2001d, so that the red light transmitted through the structure subunit is converged at four focal points on the same horizontal line at a certain distance in front of the liquid crystal display panel 5. The image is separated at multiple angles by means of the red subpixel on the liquid crystal display panel to form a monochrome naked-eye 3D image based on the red laser point light source 40.

In a case that the red laser point light source 40, the green laser point light source 41 and the blue laser point light source 42 are simultaneously projected onto the directional color filter 3, dichroic filtering is performed by the directional color filter 3 on light of three colors generated by the three laser point light sources, the light of the three colors each are projected onto respective structure subunits on the directional function structure layer. Then the projected light of the three colors each are diffracted through the nanometer diffraction gratings in the directional function structure layer, so that a color stereo image can be displayed in space.

The liquid crystal display panel 5 in this embodiment includes an array substrate, an opposite substrate, and a liquid crystal layer arranged between the array substrate and the opposite substrate. The array substrate includes multiple pixel electrodes on a side thereof facing the liquid crystal layer. The opposite substrate includes a common electrode on a side thereof facing the liquid crystal layer. The multiple pixel electrodes, the common electrode, and the liquid crystal layer form the multiple subpixels. In addition, the array substrate further includes a drive circuit configured to adjust light flux of light transmitted through the subpixel by adjusting a voltage difference between the pixel electrode and the common electrode.

In addition, the drive circuit may control a subpixel corresponding to a left-eye image to transmit light to display the left-eye image at a first timing, and control a subpixel corresponding to a right-eye image to transmit light to display the right-eye image at a second timing. The left-eye image and the right-eye image are superposed by a human brain to form a 3D image with a high resolution. Further, both the left-eye image and the right-eye image in this embodiment are multi-view images, and the 3D display effect can be achieved by images with any two successive viewing angles. Therefore, the 3D effect can be guaranteed under different observation distances with the naked-eye 3D display device in this embodiment.

Further, in a case that the liquid crystal display panel 5 displays a planar image with no parallax, two-dimensional planar display can also be achieved with the naked-eye 3D display device in this embodiment. That is, switch between the stereo image display and the planar image display can be achieved with the naked-eye 3D display device in this embodiment. The drive circuit simultaneously controls the subpixel corresponding to the left-eye image and the subpixel corresponding to the right-eye image to display so as to display the planar image. Practically, the structure, the driving manner and the display manner of the liquid crystal display panel 5 according to the present disclosure are not limited thereto, as long as the liquid crystal display panel can be combined with the laser point light source and the directional color filter to form a multi-view naked-eye 3D display device without generating visual fatigue.

For practical purposes, if it is assumed that the size of the liquid crystal display panel 5 is 55 inches and the observation distance is 3 meters, the size of a pixel unit in a single image meeting the human eye resolution is 800 micrometers. Since a pixel unit with a size of 20 micrometers can be made according to the conventional technology, 1600 viewpoints can be theoretically projected, thereby forming a realistic stereo image. Further, the period of the nanometer diffraction grating can be set as 430 nanometers or greater, and the viewing angle can be extended to 150 or greater. Optionally, according to the grating equation, the period of the nanometer diffraction grating may range from 430 nanometers to 650 nanometers.

In a specific implementation, if it is assumed that the filtering unit in the directional color filter 3 includes a red filtering subunit, a green filtering subunit and a blue filtering subunit, the size of each of the red filtering subunit, the green filtering subunit and the blue filtering subunit may be 80 micrometers×240 micrometers, thereby constituting a filtering unit with a size of 240 micrometers×240 micrometers. In a case that the directional color filter 3 has two viewpoints, the size of the filtering subunit is 80 micrometers×120 micrometers. In a case that the directional color filter 3 has four viewpoints, the size of the filtering subunit is 40 micrometers×120 micrometers. In addition, in a case that the directional color filter 3 has six viewpoints, the size of the filtering subunit is 40 micrometers×60 micrometers.

Since the view field range of the observation viewpoint is determined by the distribution range of the nanometer diffraction grating in the structure subunit, the period of the nanometer diffraction grating may range from 300 nanometers to 3 micrometers according to the grating equation. In the present disclosure, the period of the nanometer diffraction grating in the structure subunit can be set as 300 nanometers, and the diffraction angle of the nanometer diffraction grating with respect to visible light at different incident angles can reach 90 degrees. Therefore, theoretically, a numerical aperture of the directional color filter 3 according to the present disclosure for light field imaging convergence can be greater than 1, and a field angle of a corresponding viewpoint can approach 180 degrees, which actually can reach 150 degrees.

In the naked-eye 3D display device including a directional color filter, a laser point light source and a liquid crystal display panel according to the present disclosure, the directional color filter includes a continuous variable space-frequency nanometer diffraction grating array, and the laser point light source includes a beam expander and laser devices for three different colors including a red laser device, a green laser device and a blue laser device. The light filed wave-front conversion can be performed on the light emitted by the laser point light source by means of the nanometer diffraction grating on the directional color filter to form a convergence viewpoint in space, so as to provide light sources for forming images with multiple view angles. Further, the images with the multiple viewing angles on the liquid crystal display panel are spatially separated to form multiple viewpoints corresponding to the images with the multiple viewing angles, and no crosstalk occurs between the images. Therefore, no visual fatigue is caused in a process that the 3D image is observed in the window range, and the observation distance is not limited. In addition, three laser point light sources with monochrome wavelengths, including red, green, and blue laser point light sources, are used for illumination, so that no color blurring occurs in the formed 3D image, and the 3D image has a great depth of field and a wide color gamut.

With the naked-eye 3D display device in this embodiment, dichroic filtering is performed on light by the corresponding filtering subunit before the light is incident to the nanometer diffraction grating in the directional function structure layer, so that the case of light of two colors being emitted from the same nanometer diffraction grating does not occur, thereby avoiding crosstalk of the emitted light.

In addition, the naked-eye 3D display device in this embodiment is not required to be formed by high-precision structures such as a lens or a prism, and the directional color filter is easily implemented. Therefore, the multi-view naked-eye 3D display device without generating fatigue based on the directional backlight technology can be practically used.

Embodiments in this specification are described in progressive manner, each of the embodiments emphasizes differences between the embodiment and other embodiments, and the same or similar parts among the embodiments can be referred to each other. Based on the above description of the disclosed embodiments, those skilled in the art can carry out or use the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A directional color filter, comprising:
a color filter comprising a plurality of filtering units, wherein each of the filtering units comprises at least three filtering subunits for different colors, colors of light transmitted through the filtering subunits for the same color are the same; and
a directional function structure layer arranged on a light emitting surface of the color filter and comprising a plurality of structure units, wherein each of the structure units is arranged corresponding to one of the filtering units, each of the structure units comprises at least three structure subunits, each of the structure subunits is arranged corresponding to one of the filtering subunits, wherein light transmitted through each of the filtering subunits is incident to a corresponding one of the structure subunits,
wherein each of the structure subunits comprises a plurality of nanometer diffraction gratings; nanometer diffraction gratings in the same structure subunit have different periods and different orientation angles, wherein light with the same color transmitted through the same structure subunit has different viewing angles; and nanometer diffraction gratings at a same position in structure subunits in the same filtering unit corresponding to filtering subunits for different colors have different periods and different orientation angles, wherein light with different colors for compositing an image with a same viewing angle has the same viewing angle.

2. The directional color filter according to claim 1, wherein
the filtering unit comprises a red filtering subunit, a green filtering subunit and a blue filtering subunit, the red filtering subunit transmits only red light, the green filtering subunit transmits only green light, and the blue filtering subunit transmits only blue light; and
the structure unit comprises a first structure subunit, a second structure subunit and a third structure subunit, the first structure subunit is arranged corresponding to the red filtering subunit, the second structure subunit is arranged corresponding to the green filtering subunit, and the third structure subunit is arranged corresponding to the blue filtering subunit.

3. The directional color filter according to claim 2, wherein the period and the orientation angle of the nanometer diffraction grating are determined based on a wavelength and an incident angle of incident light, as well as a diffraction angle and a diffraction azimuth angle of diffracted light.

4. The directional color filter according to claim 1, wherein the directional color filter is fabricated by a photolithography technology, an ultraviolet continuous variable space-frequency photolithography technology, or a nanoimprint technology.

5. The directional color filter according to claim 1, wherein a viewpoint of the directional color filter has a field angle equal to or greater than 150 degrees.

6. The directional color filter according to claim 1, wherein the period of the nanometer diffraction grating in the directional color filter ranges from 300 nanometers to 3 micrometers.

7. A naked-eye 3D display device, comprising:
the directional color filter according to claim 1, wherein the directional color filter adjusts phases of laser light transmitted through the filtering subunits and the corresponding structure subunits, and wherein light with the same color transmitted through the same filtering subunit has different viewing angles and light with different colors for compositing an image with a same viewing angle has the same viewing angle;
a light source array arranged on a light incident side of the directional color filter and comprising at least three types of laser point light sources, wherein different types of laser point light sources emit laser light with different colors, the laser point light source is configured to emit, at a preset position, laser light to be incident to the directional color filter at a preset angle; and
a liquid crystal display panel arranged on a light emitting side of the directional color filter and comprising a plurality of pixel units, wherein each of the pixel units comprises at least three subpixels, each of the pixel units is arranged corresponding to one of the filtering units, subpixels in the same pixel unit are arranged corresponding to filtering subunits in the filtering unit corresponding to the pixel unit in a one-to-one correspondence; and the liquid crystal display panel adjusts amplitudes of laser light transmitted through the subpixels, wherein light with different colors and having a same viewing angle composites an image with the same viewing angle and images with different viewing angles composite a 3D display image.

8. The naked-eye 3D display device according to claim 7, wherein the laser point light source comprises:
a laser device configured to emit the laser light, and
a laser beam expander arranged on a light emitting path of the laser device, wherein the laser beam expander is configured to expand a diameter of the laser light, and wherein the laser light is irradiated onto an entire panel of the directional color filter.

9. The naked-eye 3D display device according to claim 8, wherein the light source array comprises a red laser point light source emitting red light, a green laser point light source emitting green light, and a blue laser point light source emitting blue light.

10. The naked-eye 3D display device according to claim 9, wherein
the at least three filtering subunits for different colors comprise a red filtering subunit, a green filtering subunit and a blue filtering subunit, the red filtering subunit transmits only red laser light, the green filtering subunit transmits only green laser light, and the blue filtering subunit transmits only blue laser light;
the at least three structure subunits comprise a first structure subunit, a second structure subunit and a third structure subunit;
the at least three subpixels comprise a red subpixel, a green subpixel and a blue subpixel; and
the red subpixel is arranged corresponding to the first structure subunit and the red filtering subunit, the green subpixel is arranged corresponding to the second structure subunit and the green filtering subunit, and the blue subpixel is arranged corresponding to the third structure subunit and the blue filtering subunit.

11. The naked-eye 3D display device according to claim 7, wherein the filtering unit comprises a red filtering subunit, a green filtering subunit and a blue filtering subunit, the red filtering subunit transmits only red light, the green filtering subunit transmits only green light, and the blue filtering subunit transmits only blue light; and the structure unit comprises a first structure subunit, a second structure subunit and a third structure subunit, the first structure subunit is arranged corresponding to the red filtering subunit, the second structure subunit is arranged corresponding to the green filtering subunit, and the third structure subunit is arranged corresponding to the blue filtering subunit.

12. The naked-eye 3D display device according to claim 11, wherein the period and the orientation angle of the nanometer diffraction grating are determined based on a wavelength and an incident angle of incident light, as well as a diffraction angle and a diffraction azimuth angle of diffracted light.

13. The naked-eye 3D display device according to claim 7, wherein the directional color filter is fabricated by a photolithography technology, an ultraviolet continuous variable space-frequency photolithography technology, or a nanoimprint technology.

14. The naked-eye 3D display device according to claim 7, wherein a viewpoint of the directional color filter has a field angle equal to or greater than 150 degrees.

15. The naked-eye 3D display device according to claim 7, wherein the period of the nanometer diffraction grating in the directional color filter ranges from 300 nanometers to 3 micrometers.

* * * * *